United States Patent
Shankar et al.

(10) Patent No.: US 8,638,664 B2
(45) Date of Patent: *Jan. 28, 2014

(54) SHARED WEIGHTED FAIR QUEUING (WFQ) SHAPER

(75) Inventors: Laxman Shankar, San Jose, CA (US); Shekhar Ambe, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 12/852,960

(22) Filed: Aug. 9, 2010

(65) Prior Publication Data

US 2010/0302942 A1    Dec. 2, 2010

Related U.S. Application Data

(63) Continuation of application No. 10/351,492, filed on Jan. 27, 2003, now Pat. No. 7,782,776.

(60) Provisional application No. 60/364,141, filed on Mar. 15, 2002.

(51) Int. Cl.
   *G01R 31/08* (2006.01)
   *H04L 12/28* (2006.01)
   *G06F 15/16* (2006.01)

(52) U.S. Cl.
   USPC .......................... 370/234; 370/412; 709/232

(58) Field of Classification Search
   USPC .............. 370/230–235.1, 412–413, 417–418; 709/229, 232, 235
   See application file for complete search history.

(56) References Cited

U.S. PATENT DOCUMENTS

| | | | |
|---|---|---|---|
| 5,274,644 A * | 12/1993 | Berger et al. | 370/230 |
| 5,828,653 A | 10/1998 | Goss | |
| 5,982,778 A | 11/1999 | Mangin et al. | |
| 6,147,970 A | 11/2000 | Troxel | |

(Continued)

FOREIGN PATENT DOCUMENTS

| | | |
|---|---|---|
| EP | 0843499 A2 | 5/1998 |
| EP | 0859492 A2 | 8/1998 |

(Continued)

OTHER PUBLICATIONS

U.S. Appl. No. 10/351,520 Final Office Action mailed Aug. 18, 2010, 37 pgs.

(Continued)

*Primary Examiner* — Redentor Pasia
(74) *Attorney, Agent, or Firm* — McDermott Will & Emery LLP

(57) ABSTRACT

A network device includes a port, a buffer, a flow control module, and a service differentiation module. The port is configured to send and receive a packet, wherein the port is connected to a network entity. The buffer is configured to store the packet. The flow control module is configured to control the transmission of the packet within the network device. The service differentiation module is coupled with the buffer and the flow control module. The service differentiation module is configured to regulate storage of the packet in the buffer and to regulate the transmission of the packet from the network device to the network entity. The service differentiation module is also configured to determine excess bandwidth available within the network device and to allocate the excess bandwidth to transmit the packet to the network entity.

20 Claims, 10 Drawing Sheets

(56) References Cited

U.S. PATENT DOCUMENTS

| | | | |
|---|---|---|---|
| 6,408,005 B1 * | 6/2002 | Fan et al. | 370/412 |
| 6,456,593 B1 | 9/2002 | Iverson et al. | |
| 6,470,016 B1 * | 10/2002 | Kalkunte et al. | 370/395.41 |
| 6,501,762 B1 | 12/2002 | Pillar et al. | |
| 6,538,989 B1 | 3/2003 | Carter et al. | |
| 6,757,249 B1 | 6/2004 | Kejriwal et al. | |
| 6,781,956 B1 | 8/2004 | Cheung | |
| 6,801,500 B1 | 10/2004 | Chandran | |
| 6,868,063 B1 * | 3/2005 | De Cnodder | 370/236 |
| 6,940,818 B2 | 9/2005 | Moran et al. | |
| 7,120,159 B2 | 10/2006 | Kumazawa et al. | |
| 7,382,727 B2 | 6/2008 | Yang et al. | |
| 7,782,776 B2 | 8/2010 | Shankar | |
| 2002/0114334 A1 | 8/2002 | Yang | |
| 2002/0114340 A1 | 8/2002 | Kumazawa et al. | |
| 2003/0065809 A1 * | 4/2003 | Byron | 709/232 |

FOREIGN PATENT DOCUMENTS

| | | | |
|---|---|---|---|
| EP | 1093266 A2 | | 4/2000 |
| EP | 1093266 | * | 4/2001 |
| EP | 1124356 A2 | | 8/2001 |
| WO | 01/43347 A2 | | 6/2001 |

OTHER PUBLICATIONS

Tanenbaum, A. S., "Computer Networks", Prentice-Hall Int.,USA, XP-002147300, Sec.5.2-Sec.5.3, Routing Algorithms and Congestion Control Algorithms,(1998), pp. 309-320.

Bernet, Y. et al., "An Informal Management Model for Diffserv Routers", XP-002291421, Diffserv Working Group, (Feb. 2001), 1-56 pgs.

Francini, et al., "A Weighted Fair Queueing Scheduler with Decoupled Bandwidth and Delay Guarantees for the Support of Voice Traffic", Globecom 2001, IEEE Global Telecommunications Conference, vol. 3 of 6, (Nov. 25-29, 2001), 1821-1827 pgs.

Tanenbaum, A. S., "Computer networks", Prentice-Hall Int., USA,Sec.5.2-Sec.5.3, (1998), 309-320 pages.

Lin, Yu-Sheng et al., "Queue Management for shared buffer and shared multi-buffer ATM switches", Department of electronics engineering & institute of electronics, National ChiaoTung University, Hsinchu, Taiwan, R.O.C.,(Mar. 24, 1996), pp. 688-695.

Office Action received for U.S. Appl. No. 10/351,492 mailed on Jan. 6, 2009, 39 pages.

Office Action received for U.S. Appl. No. 10/351,492 mailed on Jul. 24, 2008, 21 pages.

Office Action received for U.S. Appl. No. 10/351,492 mailed on Jan. 29, 2008, 22 pages.

Office Action received for U.S. Appl. No. 10/351,492 mailed on Jan. 30, 2008, 20 pages.

Office Action received for U.S. Appl. No. 10/351,492 mailed on Feb. 9, 2007, 27 pages.

Office Action received for U.S. Appl. No. 10/351,520, mailed on Jul. 21, 2009, 33 pages.

Office Action received for U.S. Appl. No. 10/351,520, mailed on Oct. 30, 2008, 31 pages.

Advisory Action received for U.S. Appl. No. 10/351,520, mailed on Apr. 18, 2008, 7 pages.

Office Action received for U.S. Appl. No. 10/351,520, mailed on Jan. 29, 2008, 20 pages.

Office Action received for U.S. Appl. No. 10/351,520, mailed on Jul. 31, 2007, 21 pages.

Office Action received for U.S. Appl. No. 10/351,520, mailed on Feb. 8, 2007, 25 pages.

Office Action received for U.S. Appl. No. 10/351,492, mailed on Sep. 16, 2009, 39 pages.

Advisory Action received for U.S. Appl. No. 10/351,492, mailed on Apr. 22, 2008, 3 pages.

Examiner Interview Summary received for U.S. Appl. No. 10/351,520, mailed on Nov. 25, 2009. 3 pages.

Office Action received for U.S. Appl. No. 10/351,520, mailed on Mar. 1, 2010, 51 pages.

Notice of Allowance received for U.S. Appl. No. 10/351,492 mailed Jun. 28, 2010, 25 pages.

Notice of Allowance received for U.S. Appl. No. 10/351,492, mailed on Mar. 9, 2010, 20 pages.

Final Office Action Reply regarding U.S. Appl. No. 10/351,520, mailed on Nov. 14, 2009.

Non-Final Office Action Reply regarding U.S. Appl. No. 10/351,520, mailed on Jun. 1, 2010.

Response to Advisory Action received for U.S. Appl. No. 10/351,520, filed Apr. 29, 2008.

Response to Office Action received for U.S. Appl. No. 10/351,520, filed Mar. 30, 2009.

Response to Office Action received for U.S. Appl. No. 10/351,520, filed Mar. 31, 2008.

Response to Office Action received for U.S. Appl. No. 10/351,520, filed May 8, 2007.

Response to Office Action received for U.S. Appl. No. 10/351,520, filed Nov. 14, 2009.

Response to Office Action received for U.S. Appl. No. 10/351,520, filed Oct. 17, 2007.

* cited by examiner

ONE WRR SCHEDULING ROUND

| Pass # | # pkts scheduled from CoS 1 (wt = 20%) | # pkts scheduled from CoS 2 (wt = 40%) | # pkts scheduled from CoS 3 (wt = 30%) | # pkts scheduled from CoS 4 (wt = 10%) |
|---|---|---|---|---|
| 1 | 1 | 1 | 1 | 1 |
| 2 | 1 | 1 | 1 | |
| 3 | | 1 | 1 | |
| 4 | | 1 | | |

FIGURE 9

SHARED WEIGHTED FAIR QUEUING (WFQ) SHAPER

REFERENCE TO RELATED APPLICATION

This application is a continuation of application Ser. No. 10/351,492, filed on Jan. 27, 2003, now U.S. Pat. No. 7,782,776, which claims the benefit of U.S. Provisional Application Ser. No. 60/364,141, entitled "Shared Weighted Fair Queuing (WFQ) Shaper" filed on Mar. 15, 2002. The subject matter of these earlier filed applications are hereby incorporated by reference.

BACKGROUND OF THE INVENTION

1. Field of the Invention

This invention relates to systems and methods for flow control within a digital communications network. In particular, this invention is related to systems and methods for performing service differentiation regarding the treatment of packets within a network device.

2. Description of the Related Art

Over the last several years, the Internet has grown into an enormous network to which virtually any large or small computer network may be connected. Thus, the unprecedented growth of Internet users has placed even greater demands on the current Internet infrastructure, especially resources of a network that are shared by multiple network devices. For example, switches, routers and hubs are resources that are shared among a network to assist in transferring packets from one network device to another network device. Unfortunately, the buffer memory and the bandwidth of these shared devices have a limited amount of resources that must be allocated among these competing network devices. Thus, in order to prevent starvation of any particular network device, a network typically provides a service differentiation priority scheme such as class of service (CoS) to allocate these shared resources among the competing network devices.

Competition for these shared resources may occur at both the input ports and the output ports of a network device. Competition for entry into the network device may occur at the input ports due to congestion. Namely, when packets are transmitted to a receiver, the receiver might not be able to process the incoming packets at the same speed as the sender transmits the packets. Therefore, the receiver may need to store the incoming packets in a buffer to temporarily hold the packets until the packets can be processed. However, since buffers are created to hold a finite amount of data, a buffer overflow may occur when the packets entering the buffer exceeds the buffer's capacity. To prevent a buffer overflow from occurring, a buffer manager may decide to drop the last few packets of the incoming packets. The buffer manager must also make a service differentiation to determine which class or queue a packet should be dropped from when there is no available buffer space. To avoid congestion wherever possible a network may use conventional algorithms such as Random Early Detection (RED) or Early Random Drop (ERD) to drop the packets from the incoming queues, in proportion to the bandwidth which is being used by each network device.

At the output ports, competition over the bandwidth may also occur. Having enough bandwidth for packet transmissions has been a problem that has plagued many conventional network systems. If the traffic flow of the outgoing packets exceeds the available rate, the packets are typically dropped by the network, which adversely affects a network's quality of service (QoS). QoS is usually associated with a network being able to deliver time-sensitive information such as live video and voice while still having enough bandwidth to deliver other traffic. Prioritization, which is also referred to as class of service (CoS) or service differentiation, is a technique employed by some networks to identify traffic according to different classifications so that the traffic having a higher priority is delivered before lower-priority traffic.

One service differentiation scheduling mechanism that has been used to allocate the available bandwidth is Weighted Fair Queuing (WFQ) in conjunction with a "leaky bucket" to control the data flow between a network device, the Internet and World Wide Web (WWW) and another device. The leaky bucket method involves configuring a network device to restrict the amount of information (i.e., packets) that a user may receive (e.g., via a port of the network device), by tokenizing the information and setting a threshold.

Thus, the network device must determine whether there are enough credits in the token bucket for a packet to be sent or whether that packet must be delayed. To ensure that the network device uses the WFQ to transmits packets according to the bandwidth policy established in the service level agreement (SLA), the network may establish specified rate parameters for receiving and transmitting the packets. The manner in which these parameters are established and controlled directly influences the network's ability to monitor, manage and control traffic flow having multiple classes of services.

Accordingly, new and improved systems and methods for establishing the operating parameters that govern the service differentiation applied to multiple CoS's as packets are transmitted by a network device are needed.

SUMMARY OF THE INVENTION

According to an embodiment of the invention, provided is a network device. The network device includes a port, a buffer, a flow control module, and a service differentiation module. The port is configured to send and receive a packet, wherein the port is connected to a network entity. The buffer is configured to store the packet. The flow control module is configured to control the transmission of the packet within the network device. The service differentiation module is coupled with the buffer and the flow control module. The service differentiation module is configured to regulate storage of the packet in the buffer and to regulate the transmission of the packet from the network device to the network entity. The service differentiation module is also configured to determine excess bandwidth available within the network device and to allocate the excess bandwidth to transmit the packet to the network entity.

According to another embodiment of the invention, provided is a method of flow control in a network device. The method includes the steps of receiving a packet, storing the packet, and regulating transmission of the packet from the network device to a network entity. The method also includes the steps of determining excess bandwidth available within the network device, and allocating the excess bandwidth to transmit the packet to the network entity.

According to another embodiment of the invention, provided is a network device. The network device includes a port, a storage means, a flow control module, and a service differentiation means. The port is configured to send and receive a packet, wherein the port is connected to a network entity. The storage means is for storing the packet, and the flow control means is for controlling transmission of the packet within the network device. The service differentiation means is coupled with the buffer and the flow control means. The service differentiation means is configured for regulating storage of the packet in the buffer and regulating transmission of the packet from the network device to the network entity. The service differentiation means is configured for determining excess bandwidth available within the network device and for allocating the excess bandwidth to transmit the packet to the network entity.

BRIEF DESCRIPTION OF THE DRAWINGS

The objects and features of the invention will be more readily understood with reference to the following description and the attached drawings, wherein:

FIG. 9 is an example of a weighted round robin scheduling round executed according to an embodiment of the invention.

DETAILED DESCRIPTION OF THE PREFERRED EMBODIMENTS

The invention provides for a class-based selected transmission of packets. In one embodiment, the invention employs a two-stage egress scheduler to implement differentiation services in order to provide different levels of services to different network users. More specifically, packets, which are positioned in a queue of an egress port of a network device, may be scheduled for transmission so that the egress traffic flow is controlled and shaped by a two-stage shaper according to the parameters, which govern the transfer rate of the packets.

For the purposes of the following discussion, the terms packet, data packet, traffic, and frame may be used interchangeably. According to a preferred embodiment of the invention, the network device may be an Ethernet switch, and accordingly, a packet may refer to an Ethernet frame as defined by IEEE 802.x and as modified herein. Other devices and packets may also be within the scope of the invention.

Before network traffic (packets) can receive differentiated treatment, the traffic may be first classified and "marked" in a way that indicates that these specific packets warrant different treatment than other packets. Typically, such different treatment can refer to priority of handling. In the Ethernet switch environment, packets may be prioritized by a priority tag. For example, an Ethernet data packet typically includes a preamble, destination address (DA), source address (SA), tag control information, VLAN, MAC type, and data fields. The tag control information may include a 3-bit priority field, a 1-bit canonical formation indicator (CFI), and a 12-bit VLAN tag or VLAN ID. The invention may be configured to classify and switch packets based on the Type-of-service (ToS) field of the IP header. A network operator may define a plurality of classes of service using the bits in the ToS field in the IP header or priority bits in the Ethernet header. The network device may also utilize other Quality-of-service (QoS) features to assign appropriate traffic-handling policies, including congestion management, bandwidth allocation, and delay bounds for each traffic class.

Figure 1:
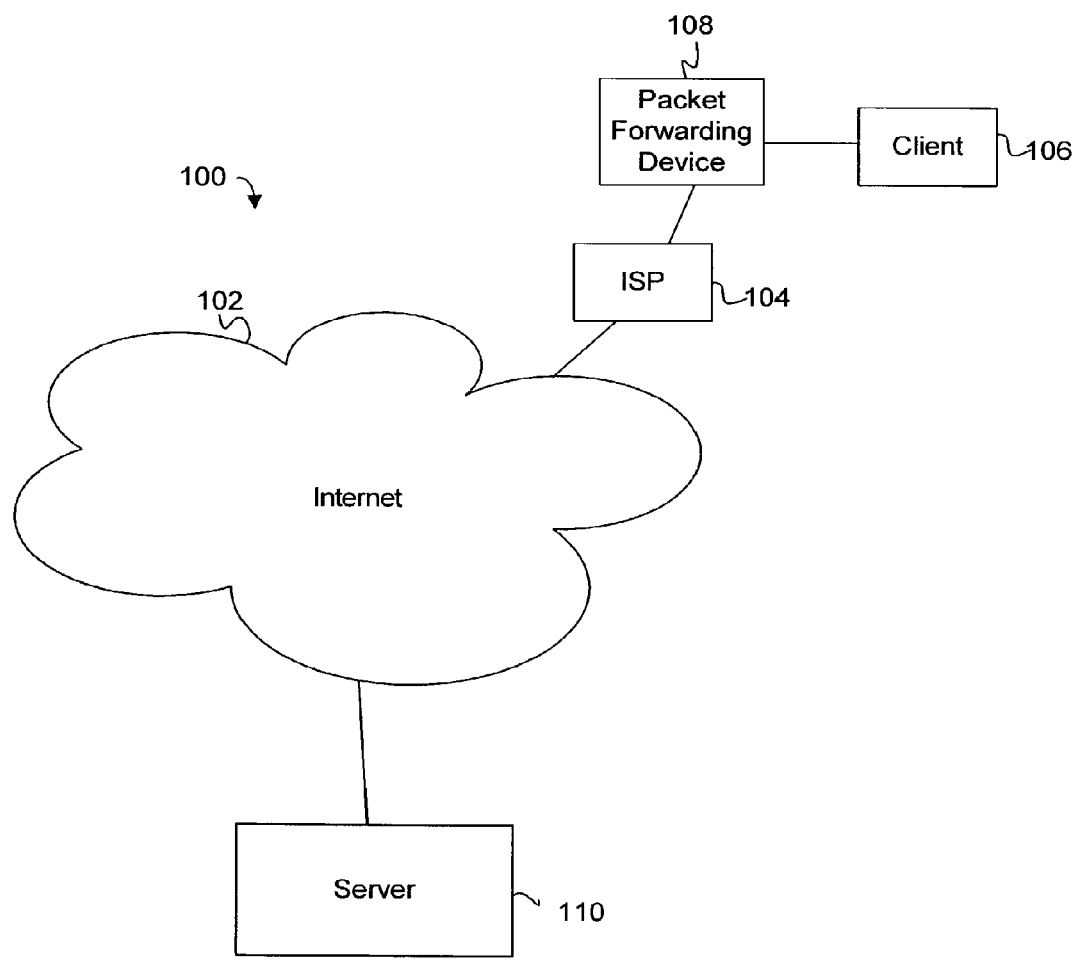
FIG. 1 is a block diagram showing elements of a network according to an embodiment of the invention.

FIG. 1 is a block diagram of a network including a network device supporting service differentiation rate control in accordance with an embodiment of the invention. FIG. 1 shows a network 100 which may include the Internet and World Wide Web 102. An ISP 104 (shown as a single device, but may include an entire network) is connected to the Internet 102 and may provide Internet service to a client 106 via an Ethernet link. Client 106 may be connected to a packet forwarding device 108 configured and/or controlled by ISP 104. Internet content is provided to client 106 via packet forwarding device 108.

In a typical configuration, ISP 104 may provide a designated amount of bandwidth to client 106 according to a service level agreement (SLA). This bandwidth may be regulated at packet forwarding device 108 via built-in rate control. One standard method of rate control is the "leaky bucket" method. According to the "leaky bucket" method, client 106 may connect to a content server 110 and download some content. Packet forwarding device 108 assigns a number of tokens to each data packet frame destined for client 106 (i.e., to the port connected to the client). The bandwidth is regulated in terms of the number of tokens client 106 is allowed to receive over a period of time, and the number of tokens may correspond to the size or the length of the packet. When client 106 meets its token threshold, the rest of the packets routed to client 106 are dropped by a conventional device. In this manner, the bandwidth of client 106 is regulated by packet forwarding device 108. However, to cure the deficiencies in the prior art, the system and method of rate control is modified as described below.

Figure 2:
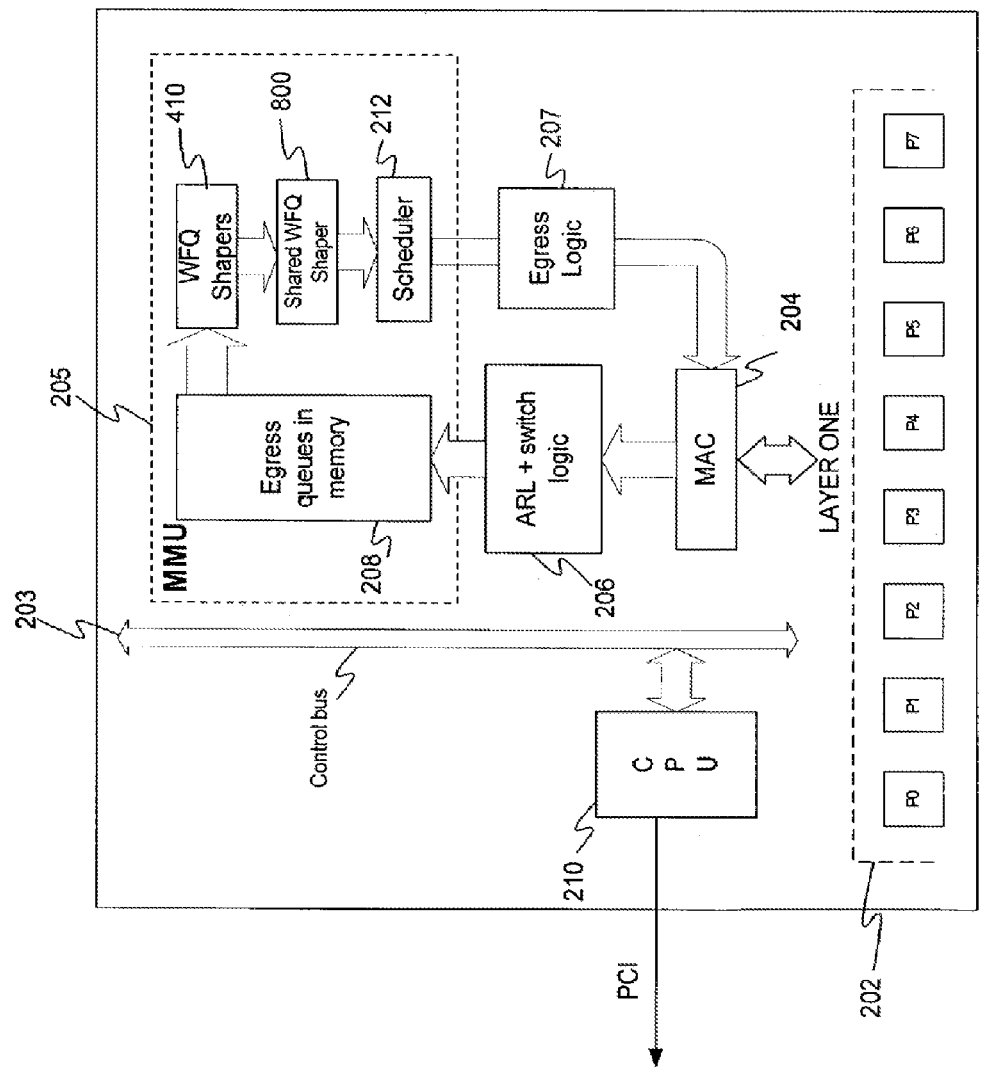
FIG. 2 is a block diagram of a network device according to an embodiment of the invention.

FIG. 2 is a block diagram of an exemplary network device according to an embodiment of the invention. Network device 200 may be, but is not limited to, a network switch, such as packet forwarding device 108, for example, and may be used within a network to control the flow of data communications to a user. Network device 200 may include a number of network ports 202 (e.g., P0-P7), which may be well known PHYs or transceivers and perform Ethernet layer one functions. Network ports 202 are connected to network devices on one end, such as client 106, and to MAC 204 internally. MAC 204 represents an Ethernet layer two system, which interfaces the layer one systems with the upper layers of the device. MAC 204 may perform standard layer two functions in addition to those described herein.

Network device 200 may also include a CPU 210 which may perform certain network functions, and which may communicate with, configure and control other systems and subsystems of network device 200. The network device may include a control bus, which carries information between CPU 210 and other devices within network device 200. Also, network device 200 may include Address Resolution Logic (ARL) 206 for performing networking functions, such as rate control, fast filter processing (FFP) congestion control, routing, learning, etc. Accordingly, ARL 206 is connected to and may communicate with MAC 204, CPU 210 and egress queues in the memory devices 208. ARL may also be configured to pre-read ("snoop") network ports 202 in order to perform in order to support rate control according to the invention.

A memory management unit (MMU) 205, which manages the memory systems of the device, may be included within network device 200. MMU 205 may include the egress queues in the memory devices 208, WFQ shapers 410, a shared WFQ shaper 800 and a scheduler 212. MMU 205 may also serve as a queue manager and a flow control module to control the transmission of the packets within network device 200. Network device 200 may include memory devices (not shown), which may connect to the egress queues in the memory devices 208. The memory devices (not shown) may be any number of registers, SRAM, DRAM or other memory as necessary to perform networking functions. The memory devices (not shown) may be a component of MMU 205 or may be a separate component. The egress queues in the memory devices 208 may provide a transmission rate for the packets leaving the memory devices (not shown) and entering WFQ shaper 410. Scheduler 212 may schedule the packets for transmission as the egress traffic is shaped by WFQ shapers 410 or shared WFQ shaper 800. An egress logic 207 may retrieve the packets which are queued in an egress buffer and transfer the packets from MMU 205 to MAC 204.

Figure 4:
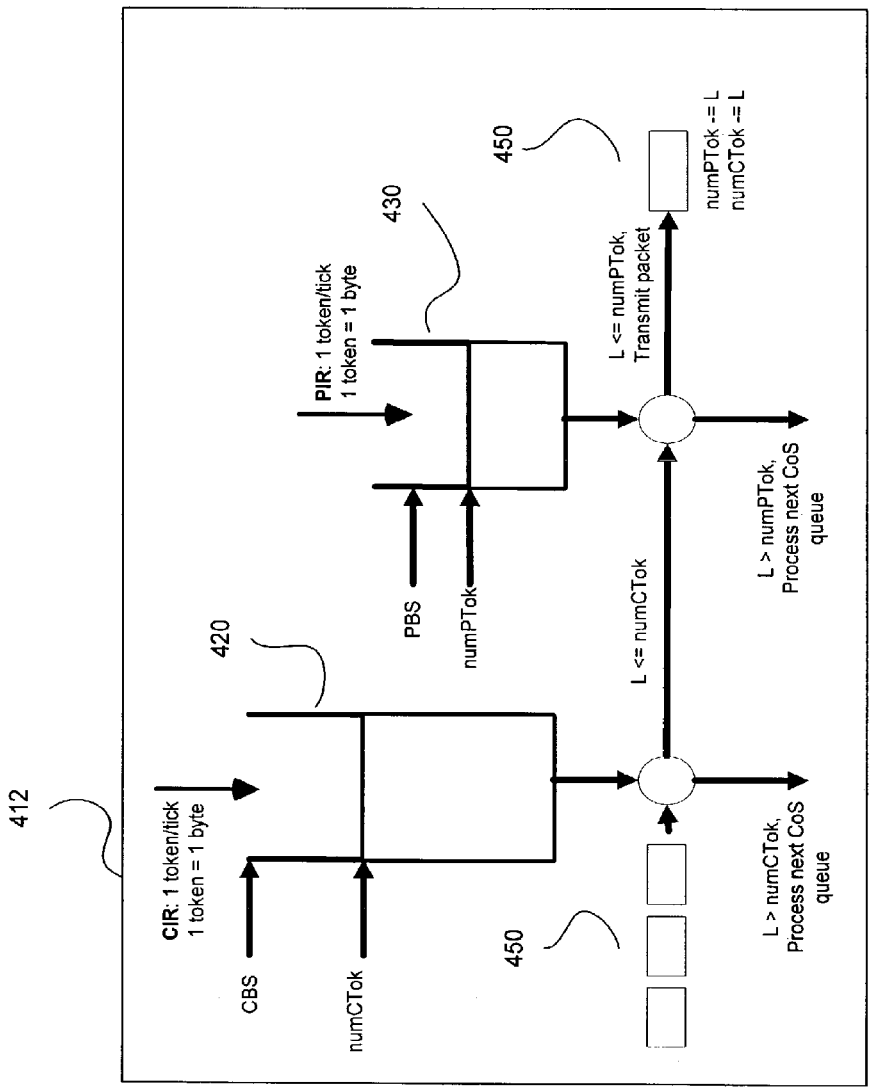
FIG. 4 is a block diagram of a shaper according to an embodiment of the invention.

WFQ shapers 410 shape the traffic flow of the packets as they are being transmitted from network ports 202. As shown in FIG. 4, the WFQ shaper may be a two-stage shaper 410 that enables network device 200 to control the traffic going out to an interface to network 100 to match the traffic flow to the speed of the destination network device and to ensure that the traffic conforms to the terms of any applicable SLA. Thus, traffic may be shaped to meet downstream requirements and to eliminate bottlenecks in topologies with data-rate mismatches.

The QoS of a network may depend upon the devices connected to the network complying with the terms of their respective SLAs. For instance, congestion caused by one network device may adversely affect the QoS levels for other devices connected to the network. Thus, the invention may employ the WFQ shapers as shaping mechanisms which monitor and control traffic flow to ensure that each network device complies with their respective SLAs. Shaping may be used at the egress ports to control the transmission of the packets out of network device 200.

Network device 200 also may include a number of interfaces for directly controlling the device. These interfaces may provide for remote access (e.g., via a network) or local access (e.g., via a panel or keyboard). Accordingly, network device 200 may include external interface ports, such as a USB or serial port, for connecting to external devices, or CPU 210 may be communicated with via network ports 202. In this example, one such interface, a peripheral component interconnect (PCI) 209, is shown connected to network device 200 via the CPU 210.

Figure 3:
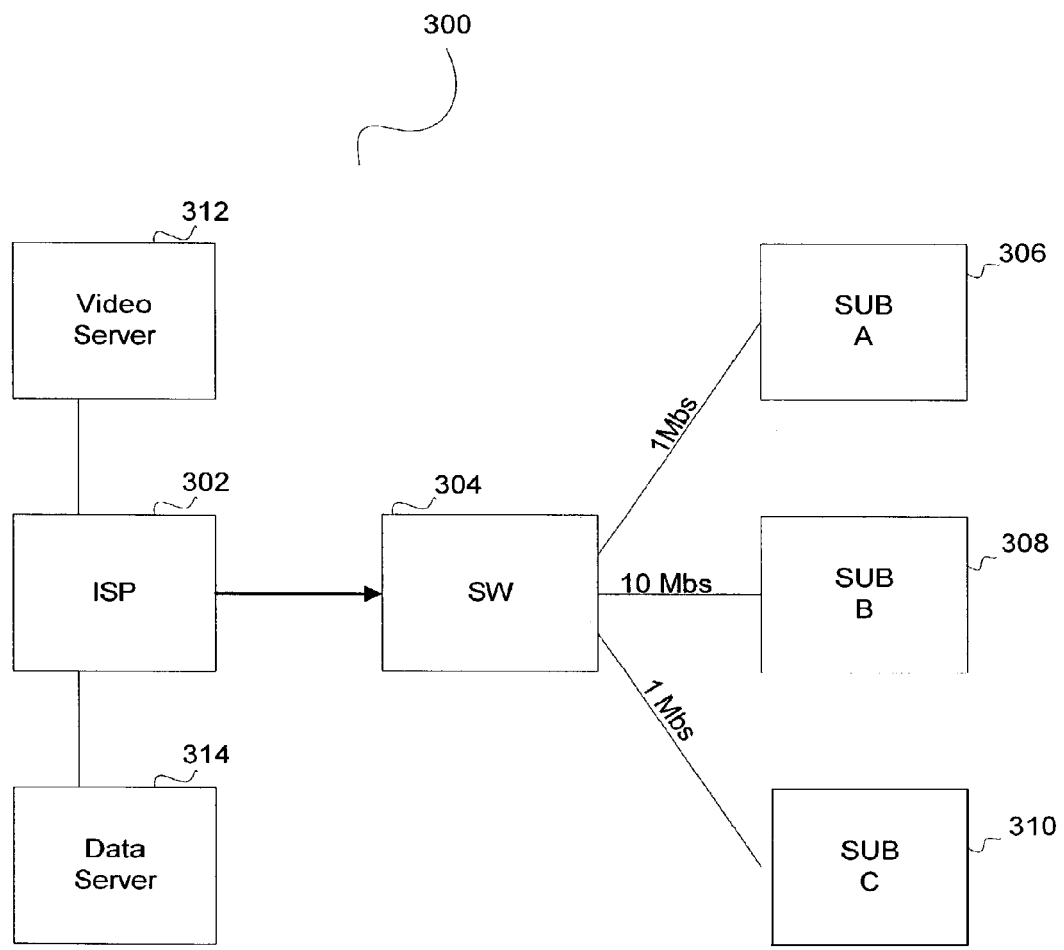
FIG. 3 is a block diagram showing elements of a network according to an embodiment of the invention.

FIG. 3 shows another block diagram of a network according to one embodiment of the invention. Network 300 includes a plurality of subscribers 306-310 each connected to a switch 304. In this embodiment, the packet forwarding device 108 is shown as switch 304. Switch 304 may be connected to the Internet via an ISP network 302. ISP 302 may be connected to a number of servers via the Internet or another network, such as to a video server 312 and data server 314. In this embodiment, it is shown that subscribers 306 and 310 each are restricted to data at a rate of 1 Mbps. Subscriber 308 is allocated data at a rate of 10 Mbps. Accordingly, subscriber 308 would be allowed 10 times as many tokens as subscribers 306 and 310 in the case when rate control is performed via the leaky bucket method. As described above, bandwidth may be allocated via the "leaky bucket" method as applied to WFQ, but is also modified as described below.

Two-stage shaper 410 provides a method for fair allocation of bandwidth because the shaper takes into account the length of a packet when proportioning and assigning the bandwidth to the respective CoS. Two-stage shaper 410 may be used in conjunction with the "leaky bucket" method as a rate control method to control the traffic flow exiting a network 100.

FIG. 4 is a block diagram of a network including a network device supporting a service differentiation in accordance with an embodiment of the invention. Two-stage shaper 410 shapes the traffic flow of the packets 450 as they are being transmitted from an egress port 202. Two-stage shaper 410 may include a first token bucket and a second token bucket. The first token bucket may be referred to as CIR bucket 420 and the second bucket may be referred to as PIR bucket 430. Network 100 may be configured so that a two-stage shaper 410 is assigned to each CoS that arrives within the network 100.

MMU 205 may serve to monitor and regulate the packets accepted into network device 200. Thus, MMU 205 may ensure that the incoming packets 450 are in compliance with the network device's SLA. WFQ shapers 410, shown in FIG. 2, may include token buckets 420 and 430 and generate token credits at a predetermined rate. WFQ shapers 410 may deposit the tokens into the respective token buckets at a predetermined interval. The predetermined rate at which the tokens are generated and the predetermined interval at which the tokens are deposited into the respective buckets may be established according to the SLA and entered by a programmer using CPU 210. Each SLA may serve as a permission ticket for a network device 200 to send a certain number of bits into the network. Thus, token buckets 420 and 430 are containers of tokens that are periodically added to the buckets by WFQ shapers 410 at a certain rate. Both buckets may have a predetermined capacity as defined according to the SLA.

CIR bucket 420 and PIR bucket 430 may establish the rate of transfer of the packets at which the tokens are accumulated within network 100. A token bucket flow may be defined by the rate at which tokens are accumulated and the depth of the token pool in the bucket. The depth of the token pool is equivalent to the number of tokens in the bucket. According to the exemplary embodiment shown in FIG. 4, the number of tokens in CIR bucket 420 is NumCTok, and the number of tokens in PIR bucket 430 is NumPTok. The rate of transfer of the packets may depend on the parameters that profile the token buckets. Thus, in this embodiment, the rate of transfer parameters may include the committed information rate (CIR), the peak information rate (PIR), the peak burst size (PBS), and the committed burst size (CBS) per class of service. Accordingly, the profile of token buckets 420 and 430 may be configured to correspond to these parameters.

Thus, in the embodiment shown in FIG. 4, tokens may be added to CIR bucket 420 at the CIR, which is the average rate of packet transmission for a particular CoS. The CBS may be defined as the maximum number of bytes of data, which may be burst at the CIR so as to not create scheduling concerns. Tokens may be added to PIR bucket 430 at the PIR, which is the upper bound of the rate at which packets can be transmitted for each CoS. The PBS is the maximum number of bytes of data that can be burst at line rate when the packets are being burst at the PIR. Thus, WFQ shaper may insert tokens into bucket 420 at the CIR and inserts tokens into bucket 430 at the PIR.

When a packet arrives at network device 200, WFQ shapers 410 may determine whether there are enough credits in the token bucket for the packet to be sent or whether that packet must be delayed or buffered. If there are a sufficient number of tokens available in the bucket, packets are assigned a number of tokens based upon the size or length of the packet. A number of tokens, which are equivalent to the byte size of the packet, are removed from the respective bucket by WFQ shapers 410. The amount of information equal to a token and the amount of tokens a user may be set by an ISP (Internet Service Provider) within a service level agreement (SLA). For example, a token may be considered to be 10 Kbits of data. A user's network device may be set to 200 tokens/second, or 2 Mbits/second (Mbps). In another embodiment, one token may be programmed to equal one byte of data. When the packets received at network device 200 exceeds the programmed transfer rate limitations, these packets may be buffered by network device 200 in a memory device.

After, WFQ shapers 410 remove the approximate number of tokens, which corresponds to the length (L) of the packet, the packet 450 is transmitted out of network 100. Thus, when traffic arrives at buckets 420 and 430 and there are sufficient tokens in the buckets, this means that the traffic conforms to the terms of the SLA.

WFQ shapers 410 may replenish the tokens of both buckets 420 and 430 at regular intervals depending on the CIR and the PIR, respectively. When WFQ shapers 410 generate the tokens and if the bucket is already full of tokens, incoming tokens may overflow the bucket. However, this overflow of surplus tokens may not be available as future packets. Thus, at any time, the largest burst a source network device can send into network 100 may be roughly proportional to the size of the bucket.

One shortcoming associated with conventional devices is the degradation of their QoS when multiple bursts arrive simultaneously at a network device so that multiple devices compete for the same input and/or output ports. When this situation occurs, long delays may occur within these conventional devices for each CoS or packets for each CoS may be dropped due to buffer overflow or congestion. Under these circumstances, a conventional device cannot guarantee the network's QoS.

To mitigate the problems associated with these conventional devices, according to one embodiment of the invention, WFQ shapers 410 may be a two-stage shaper 412, which is used to implement service differentiation and classify traffic according to granular network policies.

Figure 5:
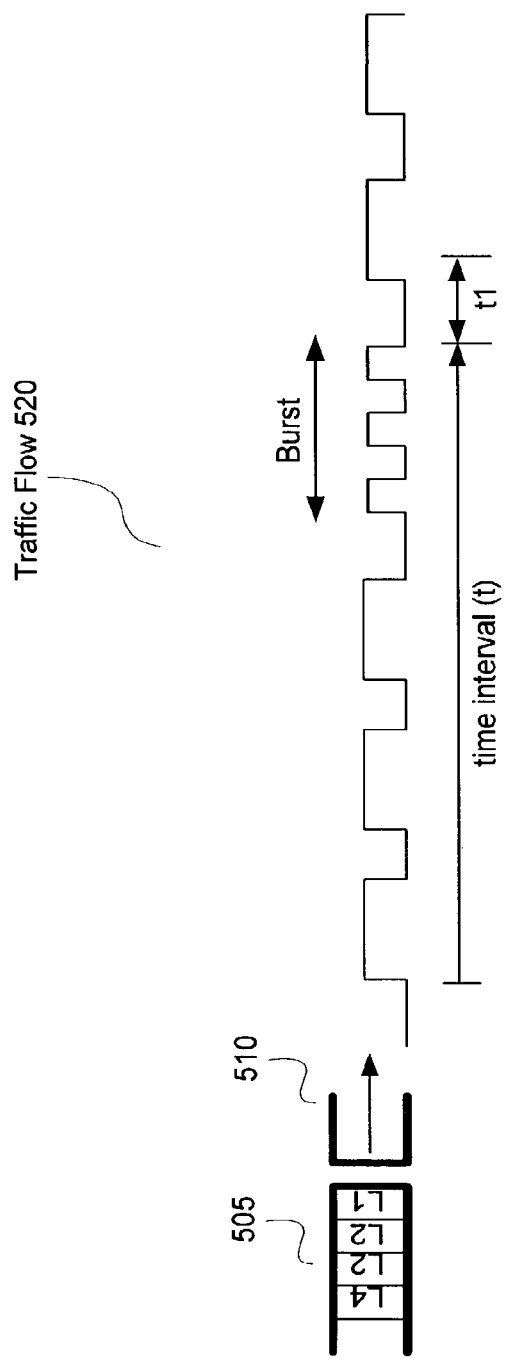
FIG. 5 depicts shaping of traffic flow exiting a network device according to an embodiment of the invention.
Figure 6:
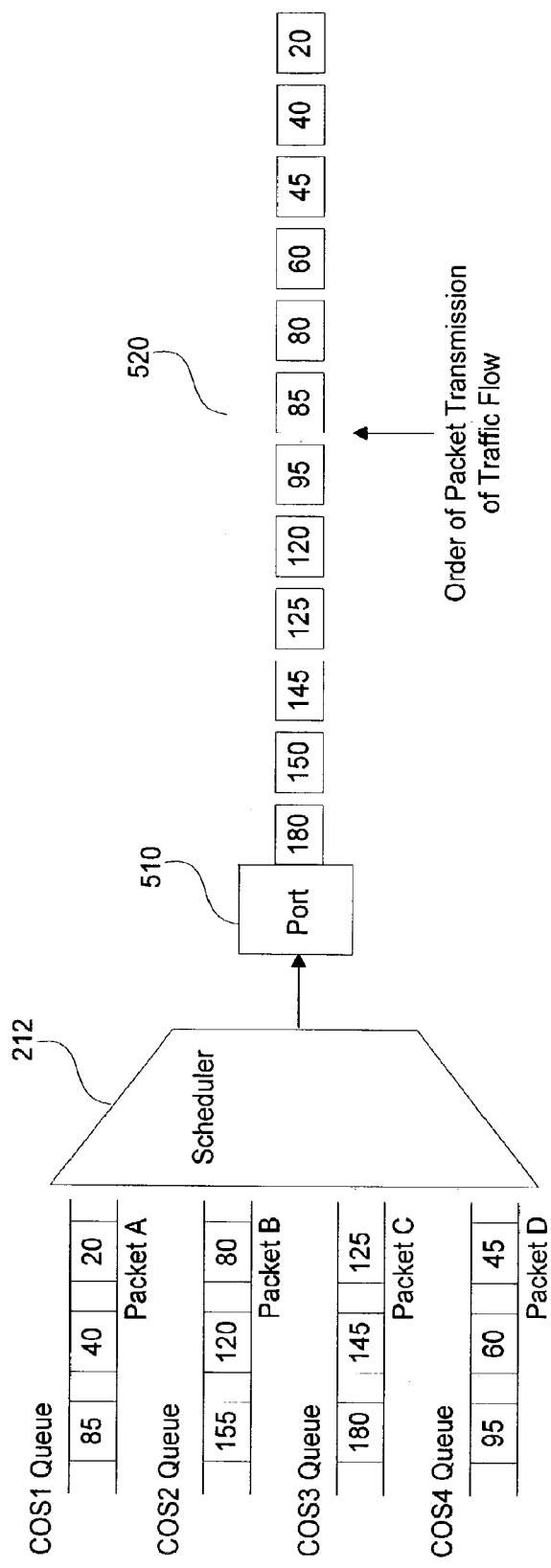
FIG. 6 is an illustration of WFQ performed according to an embodiment of the invention.

As shown in FIGS. 5-6, as the packets are placed in a transmission queue 505 of egress ports 510, two-stage shaper 412 may shape the traffic flow 520 as the packets exits the transmission ports 510 (P0-P7). According to this embodiment, shaping may be performed per CoS. Specifically, network device 200 may implement the WFQ shapers to shape the egress traffic according to the user's specified parameters. In this example, the specified parameters are defined as the CIR, PIR, PBS and CBS per CoS. Namely, network device 200 shapes a CoS queue of packets by controlling the CIR, CBS, PIR, and PBS for the CoS. The shaping may be performed at byte granularity.

When packets arrive at the network device 200 having a transfer rate of CIR or less, the invention may be configured so that CIR bucket 420 regulates and shapes the traffic flow. As shown in FIGS. 2 and 4, upon the packet's arrival, MMU 205 may inspect the header of the packet to determine the CoS of the packet. Then, based upon the CoS, MMU 205 may determine the appropriate flow control parameters to apply to the packet. WFQ shapers 410 may then inspect the length (L) of the packet and determine whether the length (L) of the packet is less the number of tokens in CIR bucket 420. Namely, WFQ shapers 410 may determine if the length (L) of the packet is less than NumCTok. If the length (L) is less than NumCTok, this means that there are enough tokens in CIR bucket 420 to transmit the packet. If so, WFQ shapers 410 may then decrement the tokens in CIR bucket 420 by the length of the packet. In FIG. 5, packets are shown in transmission queue 505 as having lengths L1, L2, L3 and L4.

If the packets arrive at network device 200 at a rate at the CIR or less and there is not a sufficient amount of tokens in CIR bucket 420, the incoming packet must wait until a sufficient number of tokens are added to CIR bucket 420 by WFQ shapers 410. When there is not a sufficient amount of tokens available, the two-stage shaper may delay or buffer the packets in memory or buffer 208 until a sufficient number of tokens have been added to CIR bucket 420 in order to regulate of the traffic by shaping the traffic flow 510 as the packets exit port 510. MMU 205 may store the packets in memory or buffer (not shown) and schedule them for transmission at a later time. When the packet is delayed by buffering or temporarily storing the packet in memory or buffer, network device 200 may use a weighted fair queue to hold and prioritize the transmission of the delayed traffic.

Meanwhile, network device advances to the next CoS queue, and the process may begin again for the first packet queued in the egress port for this CoS. As discussed above, the invention may be configured to provide a two-stage shaper per CoS queue.

When the packets are arriving at network device 200 at a rate less than or equal to the CIR, network device 200 may be configured so that only CIR bucket 420 regulates and shapes the traffic flow, as discussed above. However, if the packets start arriving at a faster approaching the PIR, then the scheduling of the transmission of the packets may take into account the parameters assigned to PIR bucket 430. Thus, network 100 may be configured so that both the CIR bucket 420 and PIR bucket 430 regulates and shapes the traffic flow at rates higher than the CIR. The invention may employ both buckets so that, in order to send packets having a transmission rate greater than the CIR, the transmission rate may not exceed both the CIR and the PIR at any one time. Thus, the rate of the packet needs to comply with the parameters of both the CIR bucket 420 and the PIR bucket 430 in order for the packet to be sent out.

Thus, in implementing the features of two-shaper shaper 412, the invention may be configured by a programmer using a CPU or a processor to operate according to several assumptions. One assumption is that the PIR may be greater than the CIR. Thus, the PIR bucket 430 may receive packets at a faster rate than CIR bucket 420. The invention may also be configured so that the CBS may be programmed to be greater than the PBS. Another assumption, which may be preprogrammed in into the CPU, is that the PBS may be greater than the maximum size packet of the CoS.

In addition, these assumptions work in conjunction with the transfer rate parameters so that PIR bucket 430 may serve to regulate and control the transmissions of the packets transmitted out of the network device 200 and to limit the amount of tokens removed from CIR bucket 420 as discussed below.

Token buckets 420 and 430 may operate so that when a packet arrives at a rate greater than the CIR, MMU 205 may inspect the header to determine the CoS. Then, WFQ shapers 410 may determine the length (L) of the packet and calculates whether the length of the packet is less than both NumCTok and NumPTok based upon the CoS. If so, this means that there are enough tokens available in both buckets 420 and 430 to satisfy the transfer rate parameters of both buckets. The number of tokens in the CIR and PIR buckets may be decremented by the length of the packet. Thus, network device 200 may remove the tokens from both token buckets 420 and 430, forward the packet out onto the network, and recalculate both NumCTok and NumPTok by subtracting the length of the packet from the number of packets contained in the respective buckets. Network device 200 may then advance to the next CoS.

If a sufficient amount of tokens is not immediately available when a packet arrives, network device 200 may buffer the packet in a memory device or buffer (not shown). Whenever the packets arrive at a rate greater than the CIR and if the length (L) of the packet is greater than the number of packets in either CIR bucket 420 or PIR bucket 430, then MMU 205 may delay or buffer the packet. In other words, if the length (L) of the packet is greater than either NumCTok or NumPTok (FIG. 4), MMU 205 may buffer the packet until a sufficient number of tokens have been added to both buckets. While WFQ shapers 410 replenish either or both buckets according to the predetermined time interval, the next CoS queue may be processed by network device 200.

PIR bucket 430 may serve to prevent CIR bucket 420 from depleting all of its tokens on large-sized packets. Network device 200 may employ PIR bucket 430 to limit the rate at which CIR bucket 420 transmits large packets. Thus, when the tokens in PIR bucket 430 are exhausted, network device 200 may stop the transmissions of these packets and place these large packets in a queue in memory or buffer for a time (t1) (FIG. 5) until the tokens have been replenished in PIR bucket 430 by WFQ shapers 410. Accordingly, as shown in FIG. 6, the WFQ algorithm, which may be carried out by CPU 210, may support variable-length packets so that traffic flows having larger packets are not allocated more bandwidth than traffic, flows having smaller packets. The WFQ algorithm may also support traffic flows with different bandwidth requirements by giving each CoS queue a weight that assigns a different percentage of output port bandwidth.

As shown in FIG. 6, based upon the lengths of the packets aligned in each CoS queue and the determination of whether there are sufficient tokens in the respective buckets to transmit the packets, the WFQ algorithm calculates and schedules the transmission of the packets from the egress port 510. When each packet is classified and placed into its respective CoS transmission queue, a scheduler 212 schedules the packets for transmission out of network device 200. As scheduler 212 applies WFQ to service the CoS queues, scheduler 212 selects the packet with the smallest length as the next packet for transmission on the output port 510. Thus, the weighting of the CoS queues may allow scheduler 212 to transmit two or more consecutive packets from the same CoS queue, as shown in the order of the packet transmission of the traffic flow 520 in FIG. 6.

Thus, network device 200 advances from each CoS checking the parameters for each CoS to determine whether there are sufficient tokens in the respective buckets to transmit the packets. If so, the packets are scheduled for transmission. However, situations may occur within network device 200 where the parameters established for both the CIR bucket 420 and PIR bucket 430 may not be satisfied for any CoS. Therefore, no CoS queue may be ready to send out a packet based upon the number of tokens currently available. For instance, if too many packets arrive over a period of time, the CIR buckets 420 and PIR buckets 430 for all CoS's may eventually become empty. Alternatively, the CIR and/or PIR bucket may contain tokens when the packets arrive, but there might not be enough tokens remaining in any CIR and PIR buckets for all CoS queues to permit the transmission of any packets. Although WFQ shapers 410 may operate to replenish the buckets for all CoS's at a predetermined time interval, in this example, the capacity of the buckets may not have yet reached a level or threshold that permits a packet to be transmitted. When no CoS is ready to transmit a packet, this may indicate that congestion exists within network device 200. Thus, network device 200 may experience a time delay in transmitting packets due to the congestion within the device.

Figure 8:
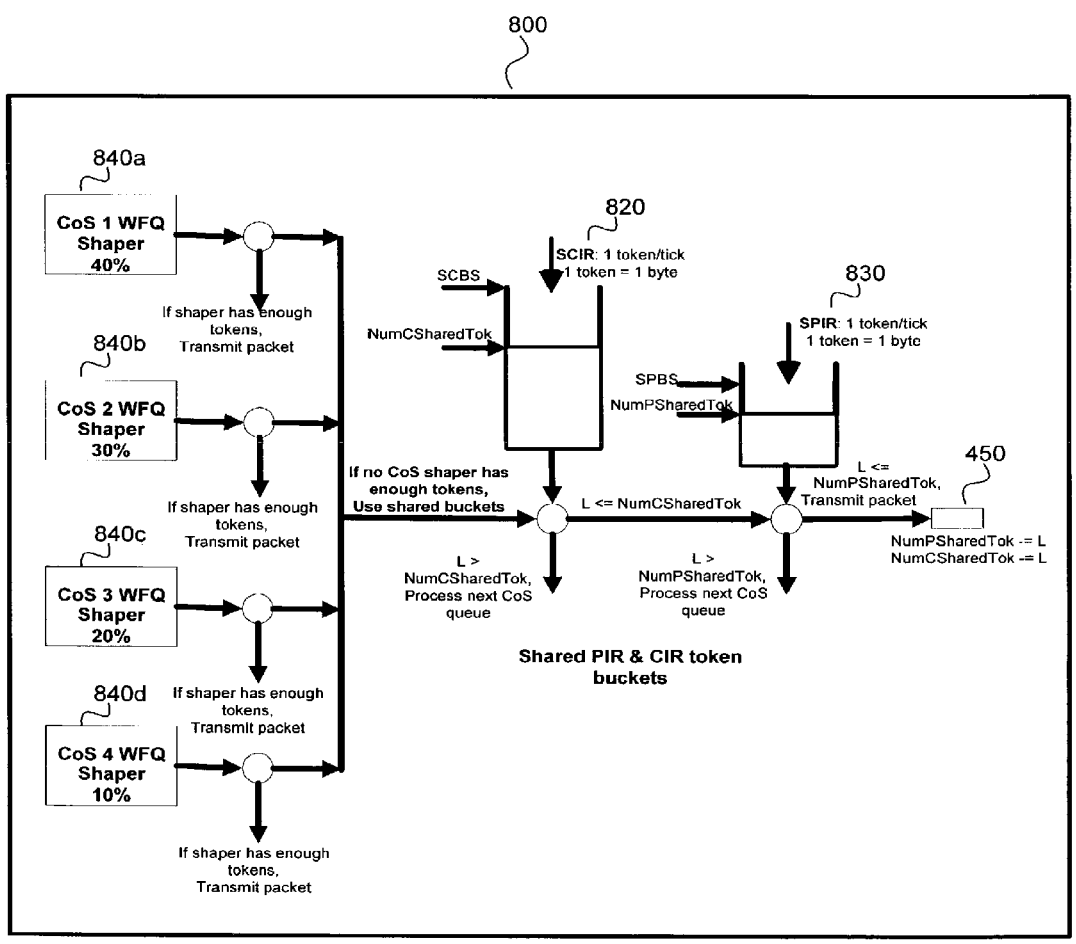
FIG. 8 is a block diagram of a shared shaper according to an embodiment of the invention.

To circumvent such a time delay and to relieve the congestion, network device 200 may also include a shared WFQ shaper as shown in FIGS. 2 and 8. The shared WFQ shaper may be a shared two-stage shaper 800, which enables all CoS's two-state shapers 840 (FIG. 8) to share the excess bandwidth available in network device 200. Excess bandwidth may develop in network device 200 when some or all of the CoS's are not using their allocated bandwidth. For instance, when none of the CoS queues are ready to transmit a packet, the unused bandwidth becomes available as excess bandwidth. Thus, the invention may employ shared two-stage shaper 800 to distribute the excess bandwidth among the CoS's. Shared two-stage shaper 800 may use weighted round robin (WRR) to distribute the excess bandwidth among the CoS queues. In other words, after WFQ has been applied to each CoS in WFQ shapers 410, and if all the CoS's are congested, a WRR scheduling mechanism may be used to process the packets of the CoS's to relieve the congestion.

Shared two-stage shaper 800 may include a first token bucket and second token bucket. The first and second token bucket may be referenced according to its transfer rate parameters. For instance, the first token bucket may be referred to as shared committed information rate (SCIR) bucket 820, and the second token bucket may be referred to as shared peak information rate (SPIR). The profile of the SCIR token bucket 820 may be configured to include the SCIR and the shared committed burst size (SCBS). The profile of SPIR token bucket 830 may be configured to include the SPIR and the shared peak burst size (SPBS).

In FIG. 8, tokens may be added to SCIR bucket 820 at the SCIR, which may be the average rate of shared packet transmission for a particular CoS. The SCBS may be the maximum number of bytes of data, which may be burst at the SCIR by all CoS's. Tokens may be added to SPIR bucket 830 at the SPIR, which may be the upper bound of the rate at which the shared packets can be transmitted for each CoS. The SPBS may be the maximum number of bytes of data that can be burst at line rate when the packets are being burst at the SPIR. Tokens may be inserted into SCIR token bucket 820 at the SCIR and into SPIR token bucket 830 at the SPIR.

Several assumptions may be programmed into the network via CPU 210 to control the operations of the shared two-stage shaper 800. One assumption may be that the SPIR is greater than the SCIR. Another assumption may be that the SPBS is greater than the maximum size packet for the CoS. An additional assumption may be that the SCBS is greater than the SPBS.

As discussed above, network device 200 may be configured to utilize a single two-stage shaper 412 to apply WFQ to each CoS. The two-stage shaper 412 may include a plurality of shapers. For example, two-stage shaper 412 may include two-stage shapers 840a, 840b, 840c, and 840d shown in FIG. 8. In other words, each two-stage shaper 840a, 840b, 840c, and 840c may include a CIR bucket and a PIR bucket. Two-stage shaper 840a, 840b, 840c and 840d may connect to SCIR token bucket 820 and SPIR token bucket 840 as shown in FIG. 8. If network device 200 applies WFQ to all the CoS shapers 840a, 840b, 840c, and 840d, and determines that no CoS is ready to send a packet, network device 200 may instruct shared two-stage shaper 800, which includes SCIR token bucket and SPIR token bucket, to apply WRR to distribute the packets positioned in the CoS queues.

A determination is made by the system whether the length of each packet (L) within each CoS is lesser than the number of tokens in SCIR token bucket 820 and SPIR token bucket 830. The number of tokens in SCIR token bucket 820 may be referred to as NumCSharedTok. Likewise, the number of tokens in SPIR token bucket 830 may be referred to as NumP-SharedTok. NumCSharedTok and NumPSharedTok may be replenished at a predetermined time interval.

Shared WFQ shaper 800 may check the length of each packet (L) within each CoS successively and if the length of the packet positioned with the CoS queue is less than NumCSharedTok and NumPSharedTok, shared WFQ shaper 800 may schedule the packet for transmission. Shared WFQ shaper 800 may assign a number of tokens to the packet based upon the length of the packet (L). Shared WFQ shaper 800 may remove the approximate number of tokens from SCIR token bucket 820 and SPIR token bucket 830. The packet will be queued for transmission.

In WRR queuing the packets for transmission, the WRR algorithm, which may be implemented by CPU 210, may assign a different percentage of the excess bandwidth to each CoS queue. For example, in FIG. 8, the bandwidth for shaper 840*a* assigned to CoS1, shaper 840*b* assigned to CoS2, shaper 840*c* assigned to CoS3, and shaper 840*d* assigned to CoS4 may be distributed as 20%, 40%, 30% and 10%, respectively. Thus at the end of one WRR scheduling round, CoS1 may transmit two packets, CoS2 may transmit four packets, CoS3 may transmit three packets, and CoS4 may transmit one packet as shown in the Table in FIG. 9.

If the length of the packet positioned in the CoS queue 840 is not less than either NumCSharedTok or NumPSharedTok, the packet will not be transmitted. Shared WFQ shaper 800 may advance to the next CoS which has been allocated the next highest percentage of bandwidth by the WRR algorithm.

Figure 7A:
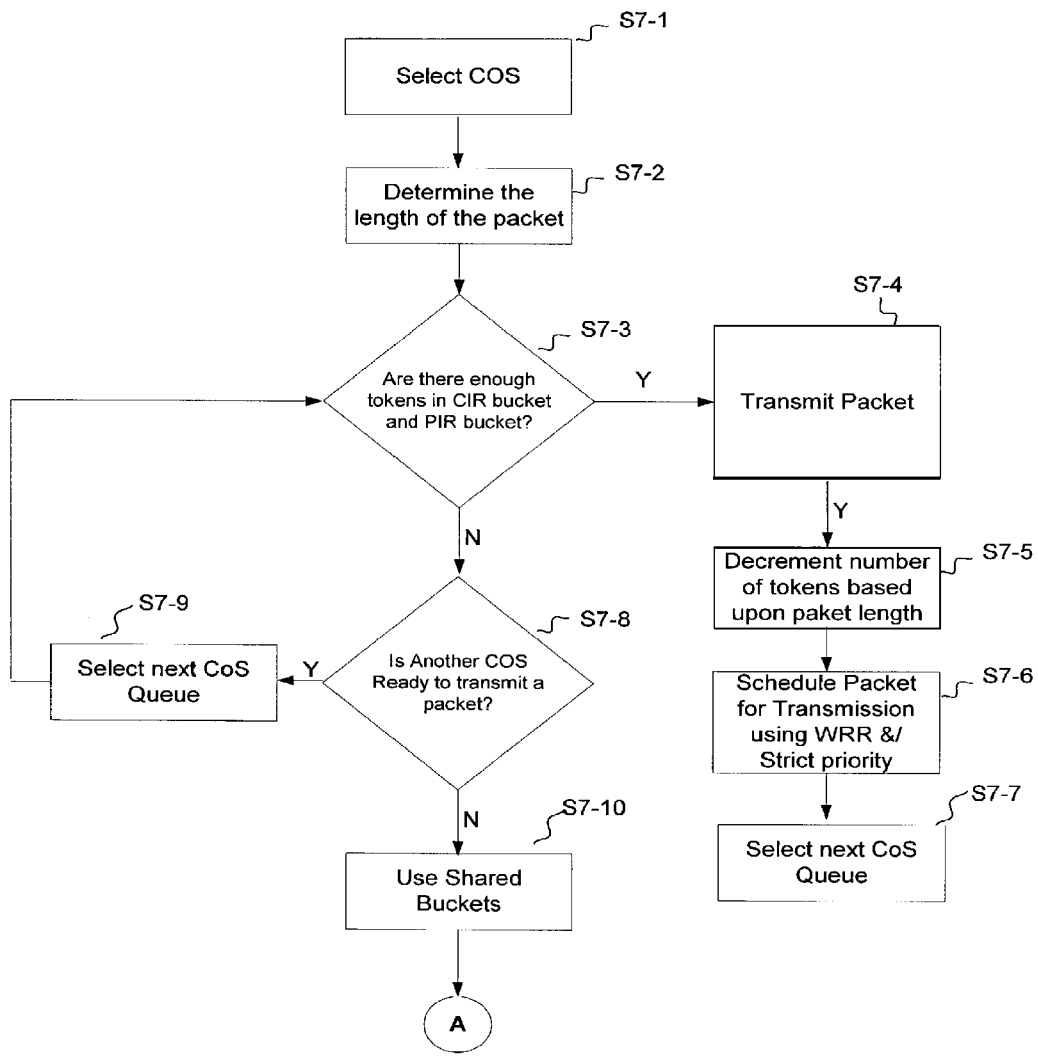
FIGS. 7A-7B are flowcharts of a method for service differentiation of multiple CoS's according to an embodiment of the invention.

FIG. 7A is a flow chart of a method for service differentiation according to an embodiment of the invention. At Step S7-1, a packet is received at a device performing rate control, such as a network device described above. The CoS for the packet is determined by a MMU which may inspect the header of the packet to classify the packet based upon a priority tag, such as a VLAN tag.

Next, at Step S7-2, The length of the packet is determined. At Step S7-3, the system determines whether there are enough tokens in the CIR bucket and the PIR bucket for the selected COS.

Next, at Step S7-4, if there are enough tokens in the CIR bucket and the PIR bucket, then the packet is prepared to be transmitted out of the network device.

If, in Step S7-5, the WFQ shaper assigns the number of tokens to the packet based upon the packet length (L) and schedules the packet for transmission according to its priority as established by the WFQ algorithm in Step S7-6. In Step S7-7, the device determines whether another CoS is ready to transmit a packet. If another COS is ready to transmit a packet, then the device advances to the next CoS.

In Step S7-3, if the length of the packet is not less than the number of tokens in the CIR bucket and the PIR bucket, this means that there is not a significant amount of tokens to transmit the packet. The system then advances to the next COS that is ready to transmit a packet in Step S7-9.

At Step S7-8, the system determines whether all CoS's are congested. Namely, based upon the number of tokens contained in the respective buckets in comparison to the length of the current packet, the system determines whether any CoS queue is ready to transmit a packet. If in Step S7-8 another queue is ready to transmit a packet, the system advances to the next CoS in Step S7-9. If in Step S7-8, there are no CoS queues that contains enough tokens to transmit a packet, the process advances to Step S7-10 and uses the shared WFQ shapers to transmit the packets from the network device. The shared WFQ shapers may apply WRR to the CoS's to distribute the excess bandwidth. Thus, a percentage of the bandwidth may be calculated by the WRR algorithm and assigned to the CoS's. Based upon the percentage distribution, the MMU initially selects the packet queued in the CoS, which is assigned the highest percentage of the bandwidth.

Figure 7B:
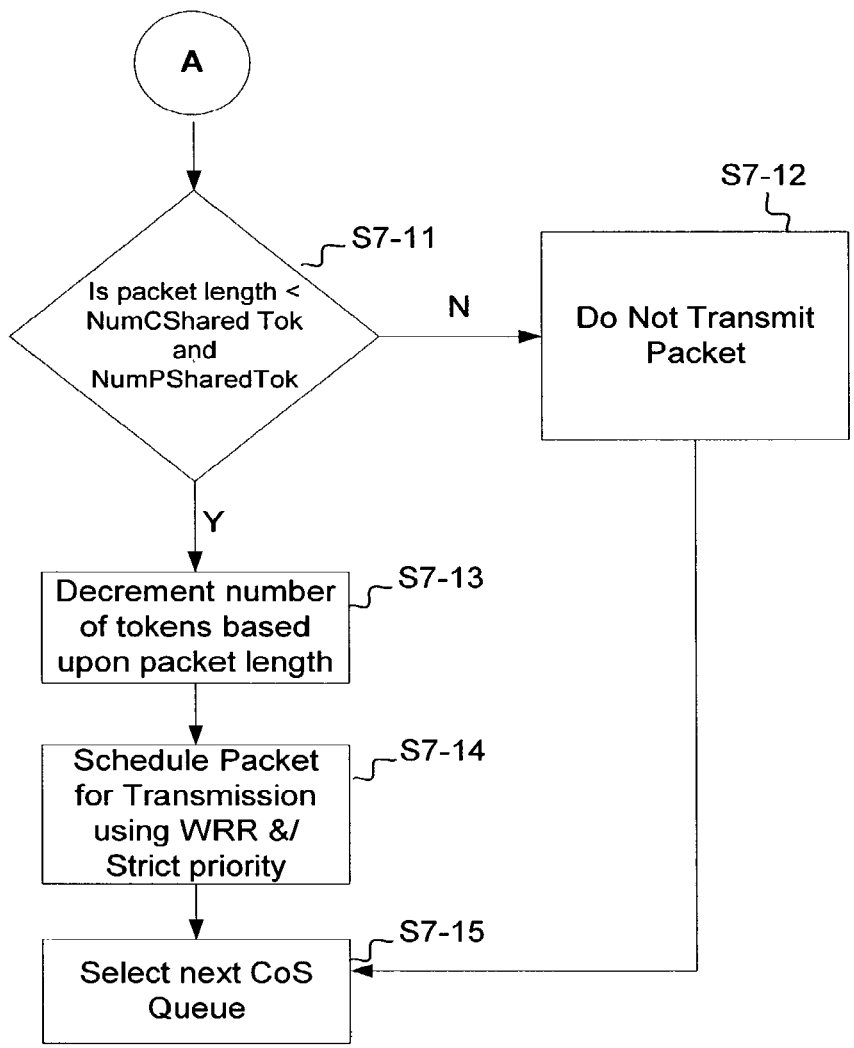

In Step S7-11 of FIG. 7B, the shared WFQ shapers may determine whether the packet can be sent out. This may be accomplished by determining whether there are enough tokens currently available in the shared two-stage shaper. Thus, in Step S7-11, the shared WFQ shapers may determine whether the length of the packet is less than the number of tokens in both the SCIR and SPIR buckets. Step S7-11 may be implemented by determining whether the length of the packet is less than the NumCSharedTok and NumPSharedTok.

If in Step S7-11, the packet length is less than the number of tokens in both the SCIR and the SPIR buckets, this means that there are a sufficient number of tokens in both buckets to transmit the packet using the excess bandwidth. In Step S7-13, the shared WFQ shapers may assign the number of tokens to the packets based upon the length of the packet (L) and decrement the corresponding number of tokens from the SCIR and SPIR buckets. The shared WFQ shapers may then transfer the packet to the scheduler so that the packet can be scheduled for transmission in Step S7-14.

In Step S7-15, the system may then apply the WRR to select the next CoS based upon the CoS assigned the next highest percentage of bandwidth.

If, in Step S7-11, the packet length is not less than both the number of tokens in the SCIR bucket and the SPIR bucket, the packet will not be sent. The process then advances to the CoS assigned the next highest percentage of bandwidth in Step S7-15.

Thus, two-stage shaper 410 and shared two-stage shaper 800 arrange and transmit the packets according to the SLA and ensures that one or more network devices do not dominate the bandwidth, to the exclusion of others. The invention also ensures that a packet or a network device adheres to the terms stipulated in a SLA and determines the QoS to render to the packet. Should congestion develop within the network device, the invention may utilize shared two-stage shaper 800 to continue transmitting the packets using the excess bandwidth. By being configured to access the excess bandwidth and use it as a medium to transmit the packets, shared two-stage shaper 800 also serves to mitigate the congestion. The invention also provides a cost-effective apparatus and method that enables lower-priority traffic equal access to the bandwidth as higher-priority traffic. To prevent low-priority traffic starvation, conventional devices typically just add more bandwidth. However, this is a costly solution. The present invention provides a cost effective solution since the present invention allocates the excess bandwidth, which is already available within the network device, instead of adding additional bandwidth.

One having ordinary skill in the art will readily understand that the steps of the method may be performed in different order, or with multiple steps in parallel with one another. Also, one having ordinary skill in the art will understand that a network device may be configured to perform the above-described method either in silicon or in software. Accordingly, one will understand that the switching configurations described herein are merely exemplary. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A network device comprising:
a port configured to send packets and receive packets within a communications network, wherein a plurality of packets comprises at least one packet traffic flow between two or more devices within the communications network;
a plurality of multi-stage class of service schedulers, wherein each multi-stage class of service scheduler is associated with a respective class of service and each multi-stage class of service scheduler is configured to:
regulate a respective packet traffic flow via at least either a first operation mode Or a second operation mode,
select between operation modes, based, at least in part, upon a transfer rate of the respective packet flow with respect to a threshold transfer rate associated with the respective class of service,
wherein the first operation mode comprises employing a first regulation model, and
wherein the second operation mode comprises employing both the first regulation model and a second regulation model; and
a shared multi-stage scheduler configured to allocate excess bandwidth amongst the packet traffic flows that are regulated by the plurality of multi-stage class of service schedulers.

2. The network device as recited in claim 1, wherein the shared multi-stage scheduler is configured to allocate the excess bandwidth to relieve congestion.

3. The network device as recited in claim 1, wherein the shared multi-stage scheduler is configured to determine a percentage of the excess bandwidth to regulate a transmission of the packets based upon an allocation of the percentage of the excess bandwidth.

4. The network device as recited in claim 1, wherein the multi-stage class of service schedulers are configured to shape the respective packet traffic flows at a byte granularity level.

5. The network device as recited in claim 1, wherein the sending of the packets from the network device occurs if a transfer rate of a current packet satisfies a set of operating parameters assigned to a first token bucket model and a length of the current packet is less than a number of first tokens included in the first token bucket model, and
wherein the set of operating parameters of the first token bucket model comprises an average rate of packet transmissions for a class of service, and a maximum number of bytes configured to be burst at the average rate.

6. The network device as recited in claim 1, wherein said the sending of the packets from the network device to another network entity occurs if the transfer rate of a current packet is greater than a transfer rate assigned to a first regulation model and a length of the current packet is less than a number of first tokens included in said first regulation model and a number of second tokens included in said second regulation model.

7. The network device as recited in claim 1, wherein the plurality of multi-stage class of service schedulers are configured to employ a weighted fair queuing scheme and the shared multi-stage scheduler is configured to employ a weighted round robin scheme.

8. A method of regulating traffic flow via a network device, the method comprising:
receiving packets; and
regulating a transmission of the packets from the network device to at least another network entity;
wherein regulating the transmission comprises:
employing a plurality of multi-stage class of service schedulers, wherein each multi-stage class of service scheduler is associated with a respective class of service and each multi-stage class of service scheduler is configured to:
regulate a respective transmission of respective packets via at least either a first operation mode or a second operation mode,
select between operation modes, based, at least in part, upon a transfer rate of the respective packets compared to a threshold transfer rate associated with the respective class of service,
wherein the first operation mode comprises employing a first regulation model, and
wherein the second operation mode comprises employing both the first regulation model and a second regulation model, and
allocating, via a shared multi-stage scheduler, excess bandwidth amongst the plurality of multi-stage class of service schedulers.

9. The method of claim 8, wherein allocating, via the shared multi-stage schedule, includes allocating the excess bandwidth to relieve congestion.

10. The method of claim 8, wherein allocating includes regulating the transmission of the packets based upon an allocation of a percentage of the excess bandwidth.

11. The method of claim 8, wherein regulating the respective transmission of respective packets of a multi-stage class of service scheduler includes regulating the transmission of respective packets at a byte granularity level.

12. The method of claim 8, wherein the regulating the transmission comprises:
transmitting of the packets from the network device, if a transfer rate of a current packet satisfies a set of operating parameters assigned to a first token bucket model and a length of the current packet is less than a number of first tokens included in the first token bucket model, and
wherein the set of operating parameters of the first token bucket model comprises an average rate of packet transmissions for a class of service, and a maximum number of bytes configured to be burst at the average rate.

13. The method of claim 8, wherein transmitting of the packets from the network device to another network entity occurs if a transfer rate of a current packet is greater than a transfer rate assigned to a first regulation model and a length of the current packet is less than a number of first tokens included in said first regulation model and a number of second tokens included in said second regulation model.

14. The method of claim 8, wherein the plurality of multi-stage class of service schedulers are configured to employ a weighted fair queuing scheme and the shared multi-stage scheduler is configured to employ a weighted round robin scheme.

15. An apparatus comprising:
a means for sending packets and receiving packets within a communications network, wherein a plurality of packets comprises at least one packet traffic flow between two or more devices within the communications network;
a plurality of multi-stage class of service scheduling means, wherein each multi-stage class of service scheduling means is associated with a respective class of service and each multi-stage class of service scheduling means for:

regulating a respective packet traffic flow via at least either a first operation mode or a second operation mode, select between operation modes, based, at least in part, upon a transfer rate of the respective packet flow with respect to a threshold transfer rate associated with the respective class of service, wherein the first operation mode comprises employing a first regulation model, and wherein the second operation mode comprises employing both the first regulation model and a second regulation model; and a shared multi-stage scheduling means for allocating excess bandwidth amongst the packet traffic flows that are regulated by the plurality of multi-stage class of service schedulers.

16. The apparatus claim 15, the shared multi-stage scheduling means for allocating the excess bandwidth to relieve congestion.

17. The apparatus claim 15, the shared multi-stage scheduling means for regulating a transmission of the packets based upon an allocation of a percentage of the excess bandwidth.

18. The apparatus claim 15, wherein the sending of the packets from the network device occurs if a transfer rate of a current packet satisfies a set of operating parameters assigned to a first token bucket model and a length of the current packet is less than a number of first tokens included in the first token bucket model, and wherein the set of operating parameters of the first token bucket model comprises an average rate of packet transmissions for a class of service, and a maximum number of bytes configured to be burst at the average rate.

19. The apparatus claim 15, wherein said the sending of the packets from the network device to another network entity occurs if a transfer rate of a current packet is greater than a transfer rate assigned to a first regulation model and a length of the current packet is less than a number of first tokens included in said first regulation model and a number of second tokens included in said second regulation model.

20. The apparatus claim 15, wherein the plurality of multi-stage class of service scheduling means are configured to employ a weighted fair queuing scheme and the shared multi-stage scheduling means is configured to employ a weighted round robin scheme.

* * * * *